United States Patent [19]
McCary

[11] Patent Number: 6,043,623
[45] Date of Patent: Mar. 28, 2000

[54] CURRENT COMPENSATION SYSTEM FOR DRIVING ELECTRIC MOTOR

[75] Inventor: Brian Douglas McCary, St. Louis County, Mo.

[73] Assignee: Bausch & Lomb Surgical, Inc., Claremont, Calif.

[21] Appl. No.: 09/161,255

[22] Filed: Sep. 26, 1998

[51] Int. Cl.[7] .................................................. G05D 23/275
[52] U.S. Cl. ............................................ 318/632; 388/937
[58] Field of Search ....................... 81/467, 469; 388/937; 318/17, 632

[56] References Cited

U.S. PATENT DOCUMENTS

| | | |
|---|---|---|
| 3,731,176 | 5/1973 | Mitchel et al. ........................ 318/619 |
| 4,541,040 | 9/1985 | Allfather ................................ 363/37 |
| 5,014,793 | 5/1991 | Germanton et al. .................... 173/12 |
| 5,077,824 | 12/1991 | Nagata et al. ........................ 388/819 |
| 5,406,503 | 4/1995 | Williams, Jr. et al. ............ 364/571.01 |
| 5,731,673 | 3/1998 | Gilmore .............................. 318/432 |
| 5,734,147 | 3/1998 | Bunker et al. .................... 219/130.33 |

Primary Examiner—Robert E. Nappi
Assistant Examiner—Rina I. Duda
Attorney, Agent, or Firm—Grant D. Kang

[57] ABSTRACT

A current compensation system for an electrical brush motor senses the amount of current by the electrical motor and generates a signal quantifying the amount of current drawn by the motor so that the amount of current drawn can be re-supplied together with a target speed signal through a power amplifier device to the electrical motor.

4 Claims, 2 Drawing Sheets

CURRENT COMPENSATION SYSTEM FOR DRIVING ELECTRIC MOTOR

BACKGROUND OF THE INVENTION

1. Field of the Invention

This invention relates to a current compensation drive circuit for an electrical motor the concepts of which may be applied to a motorized electrical hand tool.

2. Related Art

Generally, DC motors are driven with a constant voltage source if a constant motor speed is desired out of them. For motors with small winding resistances or with low mechanical loads, this may be sufficient for the application. For instance, a 24 volt compressor motor rated with a 3 amp draw and a 0.61 ohm resistance will experience only a 1.8 volt winding drop at the rated current, which is 7.5% of the drive voltage. This may well be acceptable for the compressor.

Hand tools and, in the nomenclature of ophthalmic surgical instruments, handpieces often use electrical motors. In surgical hand tools, miniaturization is of primary importance and small motors have relatively large winding resistances. For instance, in an electrical vitrectomy handpiece, a motor with a 10 mm diameter must operate at a speed that requires a back electromotive force of 8 volts, a current draw of over 100 mA, and a winding resistance of 20 ohms. In this example, the volt winding drop is in excess of 2 volts, or more than 25% of the target back electromotive force. This quantity is significant, and compensating for the volt winding drop improves the performance of the hand tool significantly.

Motors for hand tools or handpieces operate at various speeds and encounter differing loads. For example, when a hand tool is operating without a load, the rotation of the motor achieves a certain speed. However, when the hand tool encounters a load, the rotational speed decreases to a lower one.

The load experienced by a motor will vary depending on how the hand tool is used. For example, if a hand tool is used for cutting, a load condition exists when the hand tool is cutting, and a no-load condition exists when the hand tool is not cutting.

Hand tools may generate a rotational motion or a linear motion. Both of these motions originate from the motor. In the case of rotational motion, this motion may be the direct result of the turning of the motor shaft. In the case of linear motion, frequently a cam is used to translate rotational motion of the motor shaft to linear motion. This cam can cause a varying torque load on the motor shaft, even with a constant linear output load.

Every electrical motor may be characterized as having a winding resistance and a back electromotive force (BEMF). The most common motor drive approach uses a constant voltage applied to the motor. If the load on the hand tool, and hence the motor, increases significantly, the current through and voltage across the winding resistance becomes greater. If the load becomes high enough, the required current may cause the winding voltage drop to be greater than the drive voltage, and the motor stalls. For sub-stall level loads, the motor can slow down significantly.

A motor running at a rotational speed produces a BEMF proportional to that speed. The current drawn by a motor is proportional to the output torque. The work done by the motor is equal to the output shaft rotational rate in radians per second, multiplied by the output torque in newton-meters. The current drawn by the motor is equal to the voltage across the winding resistance divided by the resistance:

$$I_{motor}=(V_{supply}-EMF)\backslash R_{winding}$$

As more load is placed on the motor shaft, the motor draws more current. This means the voltage drop across the winding increases which in turn means that if the supply voltage is held constant, the BEMF must decrease and the motor must slow down.

As the motor slows down when it encounters a load, there is a variation in rotational speed. This variation in rotational speed is associated with a rotational acceleration. The rotational acceleration manifests itself as a vibration in the hand tool. Hand tool vibration is undesirable because it makes handling the hand tool more difficult and reduces the operator's ability to control the hand tool in a reliable fashion. Thus, in the surgical instrumentation field, it is highly desirable to reduce or eliminate vibration due to rotational acceleration.

For example, an electrical vitrectomy handpiece has a cam with a ball bearing that fits into a sinusoidal groove. When the ball bearing is in a flat part of the groove at either extreme, the load on the motor is low and the motor draws little current. When the ball bearing is at the steep part of the groove, the load is much greater and the motor may draw several hundred milliamps. As the motor rotor has significant rotational inertia, a rotational vibration is induced as it speeds up and slows down. This vibration is felt and seen by the operator/ophthalmic surgeon. If the site of the operation is near delicate tissue such as the retina of the eye, the vibration may be unacceptable to the doctor using the handpiece.

Accordingly, there is a need in the art to be able to operate a motor at a selected speed that is independent of the load experienced by the motor.

Motor speed is always proportional to the BEMF. As the load increases, the BEMF decreases, the current demanded goes up with the voltage and resistance remaining constant. Similarly, as the load decreases, the BEMF increases and the current demanded decreases with the voltage and resistance remaining constant. Because speed of the motor is always proportional to BEMF, if a way were devised to increase or decrease the drive voltage as the current demand changes to compensate for the drop across the winding resistance, the BEMF would remain constant, resulting in a constant speed. A constant speed would eliminate rotational acceleration in a handpiece and hence would eliminate vibration in the handpiece.

SUMMARY OF THE INVENTION

It is in view of the above problems that the present invention was developed. The invention is a circuit and method of detecting how much current is being demanded by the motor, and then providing that amount of current to the motor. In doing so, the back EMF of the motor remains relatively stable and thus the speed shows relatively little or no variation. This reduces the vibration in the handpiece significantly.

In the example of the vitrectomy handpeice, at low speeds, the current necessary to drive the motor in the peak load portion of the reciprocation cycle may be more than the average BEMF divided by the winding resistance. In these cases, if a constant voltage is used to drive the motor, the motor will stall at the maximum load conditions. If the constant drive voltage is increased to overcome the load peaks, the motor will run faster than desired. The present invention permits the motor to run at lower speeds by increasing the drive voltage during peak load periods and then lowering the drive voltage during decreased load conditions.

Generically, the circuit comprises a connector for the hand tool motor, a device for generating a signal proportional to the target speed of the motor (also proportional to the target BEMF of the motor), a device for monitoring the current delivered to the hand tool motor which generates a signal proportional to the current drawn by the hand tool motor, an amplifier that scales the combined target speed signal and the current draw signal and outputs a voltage approximately equal to the desired BEMF plus the voltage drop across the motor winding resistance. The design may optionally include a switch that disconnects the current draw signal from the amplifier when the motor is to be stopped.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
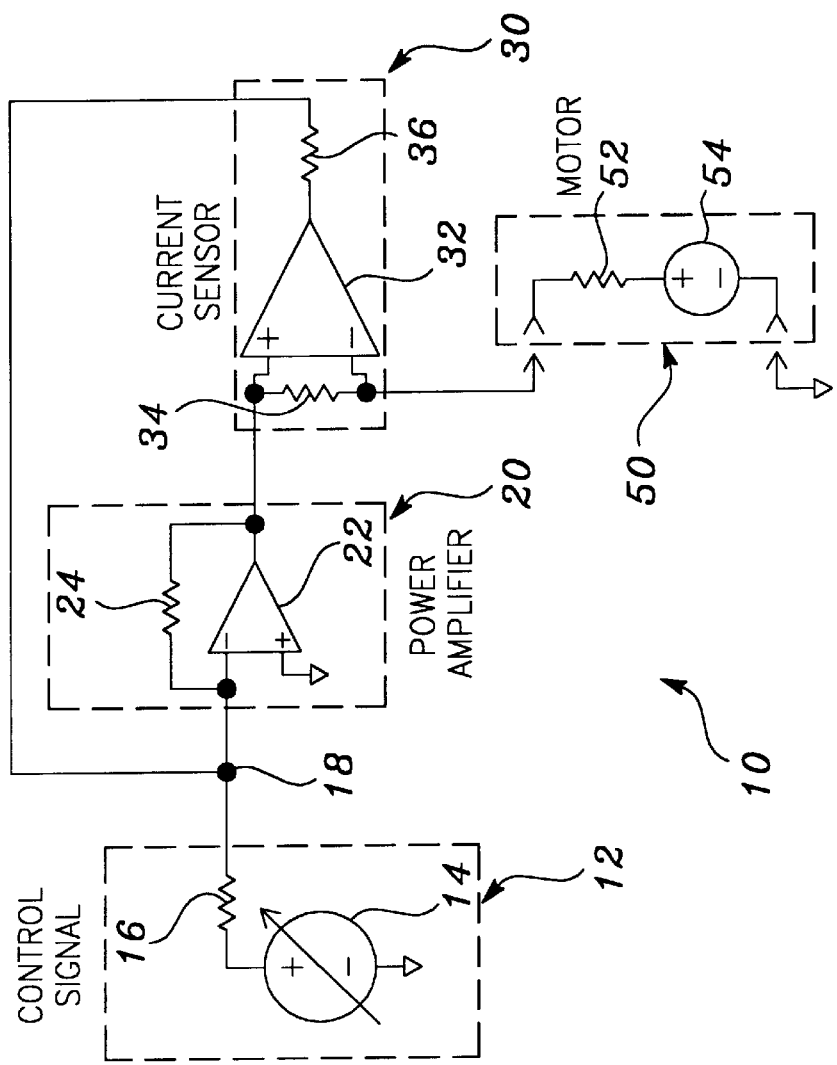
FIG. 1 illustrates a generic schematic of the drive circuit of the present invention coupled to an electrical motor.

Referring to the accompanying drawings in which like reference numbers indicate like elements, FIG. 1 illustrates the current compensation system shown generally at 10 of the present invention. Current compensation system 10 is a drive circuit comprising a control signal device shown generally at 12, a power amplifier device shown generally at 20, and a current sensor and signal generator shown generally at 30. Current compensation system or drive circuit 10 is coupled to motor 50.

Control signal device 12 generates a signal proportional to the target speed of the motor (also proportional to the target BEMF of the motor). Control signal device 12 includes variable voltage signal 14 and control signal resistor 16.

Power amplifier device 20 includes power op amp 22 and first feedback resistor 24.

Current sensor and signal generator 30 includes differential amplifier 32, sampling resistor 34, and current signal resistor 36.

Motor 50 is represented by winding resistance 52 and BEMF 54.

In operation, a signal proportional to the target speed of the motor is generated by control signal device 12. This signal passes through node 18 and into power amplifier device 20. Node 18 combines the target speed signal from control signal device 12 and a current draw signal from current sensor and signal generator 30. Power amplifier device 20 scales the combined target speed signal and current draw signal, and outputs a voltage approximately equal to the desired BEMF plus the voltage drop across winding resistance 52. Current sensor and signal generator 30 monitors the current delivered to the motor 50 and generates a signal proportional to the current drawn by motor 50. Thus, the inventive concept is that the amount of current drawn by motor 50 is sensed, and a signal is generated quantifying the amount of current drawn by motor 50 so that this amount of current can be supplied together with the target speed signal through power amplifier device 20 and ultimately to motor 50.

In reducing this concept to practice, various factors need further consideration.

To determine the target output voltages required to drive the motor, first the range of BEMFs anticipated must be determined. All brush-type DC motors have a characteristic called the velocity constant expressed in revolutions per minute (RPM) per volt. For example, a MICRO-MO motor is utilized as an example in the present invention (1016-6 volt). The MICRO-MO motor is utilized in a vitreous cutter hand tool used in posterior ophthalmic surgery. It has a velocity constant specified at 2854 RPM/VOLT. Thus, if the motor is spinning at 2854 RPM, it should generate around 1 volt of BEMF. Actual values may vary slightly. This inventor has found that for a population of 20 motors, the velocity constant was approximately 3085 RPM/VOLT. Accordingly, a value of 3100 RPM was used for most calculations.

The maximum target cut rate for the hand tool under consideration is 1500 RPM. The gear box used has a 16:1 ratio. Therefore, the target motor speed is 1500×16=24,000 RPM. If the velocity constant is 3,100 RPM/VOLT, then the target BEMF=(24,000 RPM)/(3,100 RMP/VOLT)=7.74 Volts.

Ideally, a current compensation signal will be generated that is exactly equal to the voltage drop across the motor windings. Because the known motor winding resistance is 20.1 ohms, at least 20.1 mV per mA of measured current must be generated. In addition, any current sampling resistor in series with the motor winding must be included in the winding resistance. Preferably, the value of the sampling resistor, $R_s$, 34, should be kept small so that it does not increase the total series resistance substantially, but the value should be large enough so that the signal across it does not have to be amplified excessively. In the present example, a value of 1.1875 ohms was selected. The differential amplifier 32 of current sensor 30 has a gain set by selection of a programming resistor. The gain of differential amplifier 32 equals $$\frac{50,000}{R} - 1,$$

which, in this case, is 16.06. The total current sensor trans-impedance is $A_{gain} \times R_{sampling}$=16.06×1.1875 ohms=19.07 ohms=19.07 mV/mA.

Note here that the "ideal" trans-impedance should be 20.1 ohms+1.1875 ohms=21.3 ohms. However, the current compensation circuit 10 is a positive feed-back design. That is, increasing the amplifier output voltage increases the delivered current which in turn increases the output voltage further. If the sensor trans-impedance is larger than the series resistance of the motor circuit (winding resistance+sampling resistance), the output of the power amplifier shows signs of damped oscillations. This can be prevented by using a current sensor trans-impedance value that is slightly lower than the ideal value.

However, there are two disadvantages to this approach. First, during load variations, the winding drop is not completely compensated so that the motor will slow down slightly when the load increases. In contrast, if the trans-impedance is greater than the series resistance, the motor will actually speed up during increased load. However, by compensating for most of the voltage drop, the speed variations can be limited, and therefore, the vibrations are significantly limited.

Second, the potential for low speed stall still exists. If G is defined as the ratio of the device trans-impedance for the series resistance, that is, $$G = \text{trans-impedance}/(R_{winding} + R_{sampling})$$

then if, $$[1/(1-G) \times \text{target BEFM}]/R_{winding} < \text{stall current for a particular load condition},$$

the handpiece will stall.

This equation may be considered at two extremes: when G=0 and when G=1.

When G=0, there is a device trans-impedance of 0 ohms, there is no current compensation. This is the traditional constant voltage motor drive. Here, the point of stall occurs at the usual stall condition which occurs at $$\text{Target BEMF}/R_{winding} = \text{Drive voltage}/R_{winding} < \text{Stall Current}$$

When G=1, device trans-impedance $R_{device} = R_{winding} + R_{sampling}$. In this case, the system will never stall. In the real world, however, in this case the drive voltage will peg to the rail in stall conditions providing the maximum available stall drive. If G=0.9, then stall occurs for $$[(1/0.1) \times \text{target BEMF}]/R_{winding} < \text{Stall current}$$

This means that the stall load threshold has effectively been increased by a factor of 10. In practice, all that is necessary to ensure that the handpiece will not stall at low speed conditions due to the circuit is to ensure that $$[1/1-G] \times (\text{lowest anticipated target BEMF}) > \text{Available Real Voltage}.$$

In the present case, at 400 cuts per minute, the target BEMF is 2.06 volts, G=0.895, and 1/(1−G)×BEMF= 19.68>13.6 volt rail. Thus, the circuit as designed would not prevent the power supply from delivering all of the available current possible to the hand tool under stall conditions.

Figure 2:
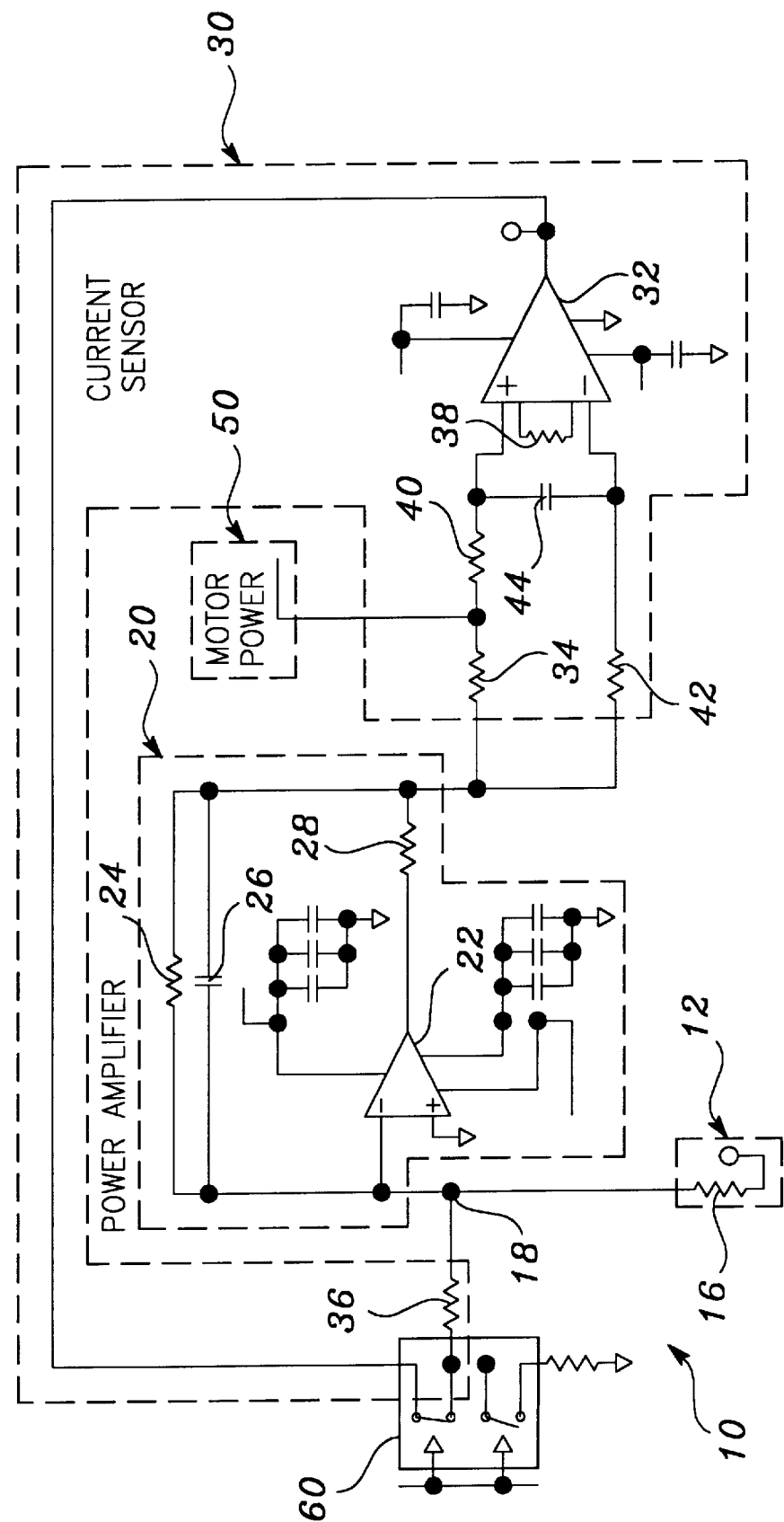
FIG. 2 illustrates a detailed schematic illustrating one specific embodiment of the present invention.

In FIG. 2, an example of a working circuit embodying the concepts of the present invention is provided. In particular, control signal device 12 provides a signal at TP11 which is 0 volts for target motor speeds of 0 RPM and is approximately negative 4 volts for target speeds of 24,000 RPM (corresponding to 2400 cuts per minute produced by a hand tool). The output was chosen to be amplified by a factor of 1.91, rendering a 4.05 volt signal output yielding a 7.74 volt target BEMF. This selection provides additional head room, in case a particular motor is encountered that has a real velocity constant somewhat lower than the tested 3,100 RPM value originally determined. In the present instance, because the application under consideration is a vitreous cutter hand tool used in posterior ophthalmic surgery, the control signal from control signal device 12 originates from portions of an ophthalmic microsurgical system such as a foot pedal and a controller that provides digital to analog conversion for the target speed signal.

Power amplifier device 20 scales the target output speed and the signal proportional to the delivered current. Specifically, power op amp 22, National Semiconductor Part No. LM12, receives the target output speed from TP11 through control signal resistor 16, and the current signal through current signal resistor 36. Thus, the node 18 function of FIG. 1 is physically accomplished within power op amp 22. Power op amp 22 amplifies and scales the signals through first feedback resistor 24. As shown in FIG. 2, the scaling factor for the speed signal is 9.09/4.75=1.91, and the scaling factor for the current signal is 9.09/9.09=1.00. Because power op amp 22 is in the inverted configuration, power op amp 22 turns the negative control signals into a positive drive signal. Capacitor 26 and resistor 28 combine to prevent oscillations on the output.

Current sensor and signal generator 30 senses and produces a signal proportional to the delivered current. The current delivered to motor 50 is delivered through sampling resistor 34. The voltage across sampling resistor 34 is fed into the two inputs of differential amplifier 32. Differential amplifier 32 is, in this case, an Analog Devices Part No. AMP02. The gain of differential amplifier 32 is set by setting resistor 38. First filtering resistor 40, second filtering resistor 42, and first filtering capacitor 44 of current sensor and signal generator 30 serve to filter out high frequency noise from the current sample. The output of differential amplifier 32, at Pin 6 is a signal equal to 19.2 mV per mA delivered to the motor.

Switch 60, Analog Devices Part No. DG412, may optionally be included as a switch for disabling the current signal feedback to improve the braking characteristics of motor 50.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, an op-amp configuration could be used as a substitute for the combined power amplifier and power amplifier feedback resistor. Thus, the breadth and scope of the present invention should not be limited by any of the above-described exemplary embodiments, but should be defined only in accordance with the following claims appended hereto and their equivalents.

What is claimed is:

1. A current compensation drive circuit for an electrical motor, comprising:

an input signal source having an output;

a power amplifier having an input connected to said output of said input signal source, having an output connected to said motor; and a current sensor connected to said output of said power amplifier, having a current sensor output connected to said input of power amplifier, and connected to a motor, for sensing current delivered continuously from said power amplifier to said motor.

2. A current compensation drive circuit according to claim 1, wherein said current sensor further comprises:

a differential amplifier having first and second inputs, and an output;

a feedback resistor having first and second ends, having said first ends connected to said output of said differential amplifier, and the other said first and second ends forming the output of said current sensor;

a current sampling resistor having first and second ends, having one of said first and second ends of said current sampling resistor connected to said output of said differential amplifier and to one of said first and second inputs of said differential amplifier, and having the other of said first and second ends of said current sampling resistor connected to the other of said first and second inputs of said differential amplifier; and wherein the other of said first and second ends of said current sampling resistor is connected to a motor.

3. A current compensation drive circuit according to claim 1, wherein said input signal source comprises:

a variable signal generator having an output; and a signal resistor having a first end and a second end, wherein one of said first and second ends of said signal resistor is connected to said output of said variable signal generator and the other of said first and second ends of said signal resistor is connected to said input of said power amplifier and connected to said output of said current sensor.

4. A method of controlling the current supplied to an electrical motor comprising:

sensing an amount of current usage by a motor;

producing a current draw signal proportional to the current usage;

combining a target speed signal and said current draw signal, and producing an output voltage approximately equal to the sum of a desired back electromotive force of the motor plus the voltage drop across the motor winding resistance; and delivering said output voltage to the motor.

* * * * *